United States Patent Office
3,067,009
Patented Dec. 4, 1962

1

3,067,009
METHOD OF SEPARATION OF HYDROGEN HALIDES FROM MIXTURES CONTAINING SAME
Jawad H. Murib, St. Bernard, and Julian Feldman, Cincinnati, Ohio, assignors to National Distillers and Chemical Corporation, New York, N.Y., a corporation of Virginia
No Drawing. Filed Apr. 28, 1959, Ser. No. 809,348
4 Claims. (Cl. 23—154)

The present invention relates to a novel process for separation of a hydrogen halide from anhydrous mixtures containing same. More particularly, the invention relates to a process for separation of a hydrogen halide from anhydrous mixtures thereof with inert gases such as hydrogen, nitrogen, argon, saturated aliphatic hydrocarbons, boron hydrides, and others.

Generally speaking, the invention embodied herein pertains to a process wherein a hydrogen halide is separated from anhydrous mixtures containing same by complexing the hydrogen halide with a Lewis-type acid in combination with certain organic solvents whereby to selectively form complexes in which the partial pressure of the hydrogen halide is negligible or substantially negligible at ordinary temperatures and the gases in mixture with the hydrogen halide can then be separated in simplified manner, as by physical means. Following such a separation, the hydrogen halide can be easily regenerated from the complex as, for example, by heating the complex. Thus, and as is described more fully hereinafter, the process embodied herein may be carried out for selective complexing of the hydrogen halide with a suitable metal halide, such as certain halides of (elements) from groups III–A, IV–A and V–A of the periodic table, zinc chloride and ferric chloride in the presence of a suitable organic solvent, including ethers, such as aliphatic ethers, chlorinated aliphatic ethers, aliphatic aromatic ethers, dialiphatic sulfides, aliphatic aromatic sulfides, etc., as well as hydrocarbons such as alkylaryl hydrocarbons.

As is known to those skilled in the art, a hydrogen halide such as anhydrous hydrogen chloride can be separated from gaseous mixtures containing same by certain physical or chemical means. Generally, use of physical means for such a purpose is limited to mixtures in which the hydrogen chloride exhibits sharp differences in physical characteristics from the other components; and chemical techniques, such as those wherein the hydrogen chloride is reacted in aqueous alkaline solutions, or complexed with tertiary amines, are inefficient mainly due to essential use of unduly expensive regeneration operations, undue loss of expensive complexing agents, etc.

Thus, the primary object of the present invention is to provide a process for efficient separation of an anhydrous hydrogen halide from gaseous mixtures. A further object is to provide such a process wherein such halides are substantially completely regenerated in substantially pure form; and a still further object is the substantially complete regeneration of the complexing agents used in such a process.

Although it is not intended that the present invention be bound by any theory as to the particular reactions that occur in the process embodied herein, it is believed that the complex formation involves the following mechanism when use is made of an ether in combination with a Lewis-type acid:

$$HX + MX_n + mR_2Z = [R_2ZH^+, M(R_2Z)_{m-1}X^-_{(n+1)}]$$

wherein X is a halogen atom, M is a metal (as is more specifically described hereinafter) and $R_2Z$ is an ether wherein Z is an element of a group VI–A element, i.e., oxygen, sulfur, selenium, tellurium. In the use of such ethers, the ether chosen should have a volatility substan-

2 tially lower than than of any gas in admixture with the hydrogen halide.

Regarding such ethers, useful for the process embodied herein are ethers containing an aliphatic group containing up to about 6 carbon atoms as, for example, dimethyl ether, diethyl ether, diisopropyl ether, dibutyl ether, diisobutyl ether, dihexyl ether, and others. Halogenated aliphatic ethers are likewise useful in the process, as for example, ethers such as bis-2-chloroethyl-ether, bis-3-chloropropyl-ether, and the like, as are certain alkylaryl ethers, such as anisole, phenetole, and others. Of the ethers, those having relatively low volatility characteristics such as dibutyl ether, bis-chloroethyl-ether, and the like are preferred. Sulfide, such as dialkyl sulfide and alkyl aryl sulfides, solutions of Lewis acids of the metal halide type may also serve as complexing agents for anhydrous hydrogen halides. Sulfides useful in the process embodied herein are those corresponding to the aforesaid oxygen ethers except that the oxygen is replaced by sulfur. The sulfides such as dimethyl sulfide, diethylsulfide, and methyl phenyl sulfide are preferred.

With respect to alkylaryl hydrocarbons as the selective complexing agent, substances such as toluene, ethylbenzene, the xylenes, mesitylene, the durenes and, in general, alkyl benzenes containing up to about 6 carbon atoms in the alkyl substituent may be used with toluene, xylene and mesitylene being preferred embodiments.

The Lewis-type acids suitable for use in practice of this invention are, as aforesaid and in addition to substances such as ferric chloride and zinc chloride, the halides of certain elements from groups III–A, IV–A, and V–A of the periodic table. Examples of such metal halides include $AlCl_3$, $GaCl_3$, $InCl_3$, $TlCl_3$, $SnCl_4$, $PbCl_4$, $SbCl_5$ and $AsCl_5$ with substances such as ferric chloride, stannous chloride and aluminum chloride being preferred.

In particular, the invention is directed to mixtures containing a hydrogen halide that selectively form a complex with ethers, sulfides and alkylaryl hydrocarbons, as aforedescribed, in the presence of Lewis-type acids. Inert gases such as nitrogen, argon and helium, saturated aliphatic hydrocarbons such as methane, ethane, propane, isobutane, and the like, and boron hydrides such as diborane may also be present. A particular application of the invention embodied herein is the separation of hydrogen chloride from anhydrous gaseous mixtures containing same, a boron hydride such as diborane as well as such mixtures that in addition contain other inert gases, such as a saturated aliphatic hydrocarbon, e.g., ethane.

In practice of the invention, the amount of the complexing agent that is used in proportion to the solvent (i.e., ether, thioether, alkylaryl hydrocarbon, etc.) is such that the hydrogen halide is complexed but, preferably, the amounts of the complexing agent and solvent is controlled such as to complex substantially all of the hydrogen halide while obviating or minimizing the use of substantial excess amounts of the complexing agent and solvent. However, though not in preferred embodiment, the invention can be carried out using an excess of the complexing agent and solvent and of the latter two substances an excess of the solvent is, in most cases, not particularly disadvantageous. In specific embodiments, such as when a boron hydride is present in the anhydrous mixture from which a hydrogen halide is to be separated, it is preferred to first form a mixture of the metal halide with the solvent and then form the complex with the hydrogen halide. In instances wherein a boron hydride is present in the mixture from which a hydrogen halide is to be separated, and a dialkyl sulfide is used, it is preferred to avoid use of a substantial, if any, excess of the sulfide.

The process embodied herein, for the step wherein the complex is formed with the hydrogen halide, can be carried out at temperatures up to about room temperature. That is, up to about 25° C. but, preferably, substantially lower temperatures such as below about 0° C. are used, with particularly suitable results being obtained by use of temperatures of from about −80° C. to about 0° C. The complexing operation can be carried out either below, above or at atmospheric pressure.

As to the complex formed with the hydrogen halide, the hydrogen halide can be recovered therefrom by heating the complex and, for that purpose, heating to a temperature of from about 50 to about 200° C. may be used with a preferred temperature range for that purpose being about 75 to about 150° C. Superatmospheric pressure may be employed but proportionally higher desorption temperatures are thereby required. It is therefore preferred to conduct the desorption at one atmosphere or lower. In general, however, the complex is heated to a temperature sufficient to cause desorption of the hydrogen halide in substantially pure form, for reuse where substantially pure hydrogen halide is necessary, and the metal halide-solvent complex that remains can be recycled as such in the process embodied herein for absorption or complexing of hydrogen halide from gaseous mixtures containing same.

In order to further describe the invention, several embodiments are set forth in the following examples and which are for purposes of illustration and not limitation.

*Example I*

An anhydrous mixture of 3.32 g. $AlCl_3$ and 5.07 g. m-xylene was frozen at −196° C. and evacuated to remove any traces of air. A gaseous mixture containing 67.2 cc. (standard conditions) of anhydrous hydrogen chloride and 109 cc. of diborane was then condensed on the $AlCl_3$-m-xylene mixture at −196° C. and the mixture was then warmed to room temperature, and recooled to −196° C. This procedure was repeated several times to insure complete contact of the gaseous mixture with the complexing agent. Finally, the mixture was warmed to −80° C. and the noncondensable gas which distilled had a vapor tension of 225 mm. Hg at −112° C., corresponding to that of pure diborane, thereby illustrating the suitability of the process of the present invention for separation and recovery of diborane from gaseous mixtures containing same and hydrogen chloride.

*Example II*

A gaseous mixture comprising 5.88 mmoles of diborane, 1.49 mmoles ethane and 2.65 mmoles anhydrous hydrogen chloride was contacted with a ferric chloride etherate of beta, beta′-dichloroethyl ether (3.80 g. $FeCl_3$ in 20.0 ml. $(ClCH_2CH_2)_2O$) and the resulting mixture was condensed at −196° C. to facilitate solution of the gases in the etherate. Complete reaction of the hydrogen chloride with the etherate was obtained by warming the solution to room temperature and stirring. Upon subsequent cooling to −80° C. and fractionation, the treated gases contained over 95% of the diborane, all of the ethane, and only 10% of the hydrogen chloride in the starting mixture. By warming the etherate containing the hydrogen chloride-ferric chloride complex under reduced pressure (1–2 mm. Hg) to 70° C. essentially all of the absorbed hydrogen chloride was regenerated as a pure anhydrous gas. The remaining ferric chloride etherate was simultaneously regenerated.

*Example III*

An anhydrous solution of 25.0 mmoles aluminum chloride in 12.3 mmoles dimethyl sulfide was heated to 95° C., cooled to room temperature, and evacuated to remove any volatile materials. A gaseous mixture (held at 770 mm. Hg and 26° C.) containing hydrogen and hydrogen chloride (7.4 millimoles, partial pressures 240 mm. Hg) was bubbled through the aluminum chloride-dimethyl sulfide solution, maintained at 0° C. The emerging gas was finally passed through two bubblers arranged in series containing mercury and distilled water, respectively. The flask containing the initial gaseous mixture was swept with additional hydrogen into the aluminum chloride-thioether solution. The effluent hydrogen contained essentially no hydrogen chloride as shown by titration of the scrubbing water with standard alkali. The thioether solution was then evacuated while held at 0° C. to remove the residual hydrogen. At room temperature the solution was found to exert a pressure of 3 mm. Hg. Heating at 100° C. under vacuum generated a mixture of dimethyl sulfide and hydrogen chloride leaving aluminum chloride behind. The hydrogen chloride was separated from the dimethyl sulfide by fractionation in essentially quantitative amounts.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for separating hydrogen chloride from anhydrous gaseous mixtures thereof with at least one gas from the group consisting of boron hydrides, hydrogen and saturated aliphatic hydrocarbons, which comprises contacting said gaseous mixture, at a temperature that does not exceed about 25° C., with a complex formed by (1) Lewis-type acid halide from the group consisting of a chloride of a group III–A metal, a chloride of a IV–A metal, a chloride of a group V–A metal, ferric chloride and zinc chloride with (2) an organic solvent from the group consisting of aliphatic-, chlorinated aliphatic-, and aliphatic aromatic-ethers of a group VI–A element consisting of oxygen, sulfur, selenium and tellurium, said complex formed by (1) and (2) being characterized by selectively complexing the hydrogen chloride in the gaseous mixture to provide a complex of hydrogen chloride that is less volatile than the other gas in mixture with the hydrogen chloride, and heating the resulting complex of the hydrogen chloride to dissociate the hydrogen chloride, said process being further characterized in that the gaseous mixture from which the hydrogen chloride is to be separated is contacted with an amount of the complex formed by (1) and (2) sufficient to complex substantially all of the hydrogen chloride in the gaseous mixture, and then separating the resulting purified gas from the complex containing the hydrogen chloride.

2. A process, as defined in claim 1, wherein the complex of the hydrogen chloride is heated to from 50 to 200° C. to dissociate the complex.

3. The process of claim 1 wherein said anhydrous gaseous mixture comprises diborane, ethane and hydrogen chloride; said organic solvent is beta, beta′-dichloroethyl ether; and said acid halide is ferric chloride.

4. The process of claim 1 wherein said anhydrous gaseous mixture comprises hydrogen and hydrogen chloride; said organic solvent is dimethyl sulfide; and said acid halide is aluminum chloride.

References Cited in the file of this patent

UNITED STATES PATENTS

| | | |
|---|---|---|
| 2,234,738 | Maude | Mar. 11, 1941 |
| 2,282,712 | Eng | May 12, 1942 |
| 2,356,345 | Osborne et al. | Aug. 22, 1944 |
| 2,389,457 | Pines et al. | Nov. 20, 1945 |
| 2,397,768 | Wadley | Apr. 2, 1946 |

OTHER REFERENCES

J. W. Mellor's: "A Comprehensive Treatise on Inorganic and Theoretical Chemistry," vol. 2, 1922 ed., pages 196–197, Longmans, Green and Co., N.Y.